(12) United States Patent
Beuzieron

(10) Patent No.: US 7,632,442 B2
(45) Date of Patent: Dec. 15, 2009

(54) METHOD FOR MANUFACTURING AN INORGANIC YARN

(76) Inventor: Lilo Nessim Beuzieron, 11255 Kling St., West Toluca Lake, CA (US) 91602

( * ) Notice: Subject to any disclaimer, the term of this patent is extended or adjusted under 35 U.S.C. 154(b) by 652 days.

(21) Appl. No.: 11/144,361

(22) Filed: Jun. 3, 2005

(65) Prior Publication Data
US 2006/0273484 A1 Dec. 7, 2006

(51) Int. Cl.
*D01D 1/04* (2006.01)
*D01D 5/088* (2006.01)
*D01F 9/08* (2006.01)
*D02G 3/16* (2006.01)
*D02J 1/22* (2006.01)

(52) U.S. Cl. .......................... 264/103; 19/236; 57/315; 65/438; 65/475; 264/130; 264/210.6; 264/210.8; 264/211.11; 264/211.12; 264/211.14

(58) Field of Classification Search ................. 264/129, 264/130, 210.6, 210.8, 211.11, 211.12, 211.14, 264/103; 19/236; 57/315; 65/438, 475
See application file for complete search history.

(56) References Cited

U.S. PATENT DOCUMENTS 2,363,569 A 11/1944 Caldwell
2004/0244427 A1 12/2004 Lee

*Primary Examiner*—Leo B Tentoni
(74) *Attorney, Agent, or Firm*—Delaney IP

(57) ABSTRACT

A method and system for manufacturing an inorganic yarn require a mixture of volcanic rock and an additive including potassium permanganate. This mixture is heated to form a melt. From the melt, a plurality of filaments are formed during a spinning process. After cooling and sizing the plurality of filaments to form fibers, the fibers are twisted to create the inorganic yarn.

20 Claims, 1 Drawing Sheet

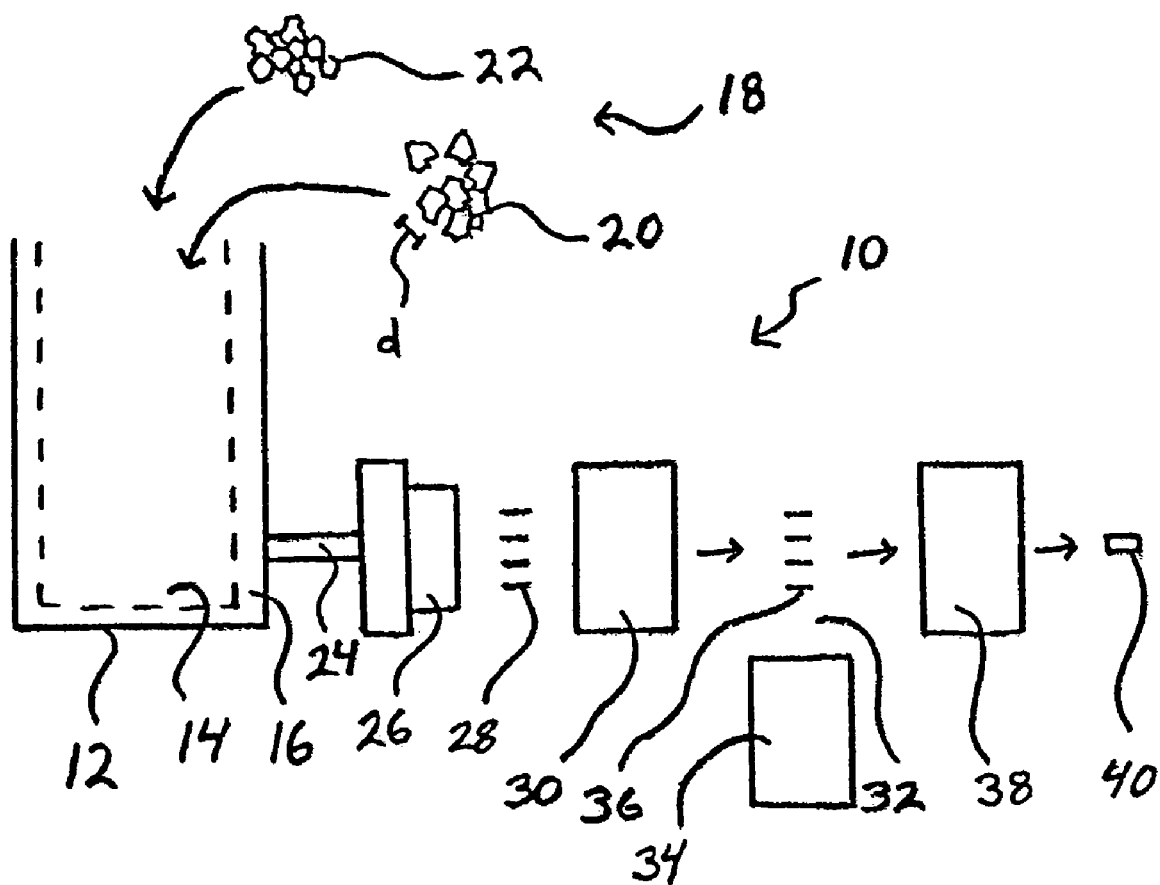
Figure

METHOD FOR MANUFACTURING AN INORGANIC YARN

FIELD OF THE INVENTION

The present invention pertains generally to devices and methods for manufacturing yarn. More particularly, the present invention pertains to such devices and methods that use inorganic raw materials to form the yarn. The present invention is particularly, but not exclusively, useful for creating an inorganic yarn from raw materials including black rock.

BACKGROUND OF THE INVENTION

Conventional twisted yarn constructions are customarily produced from organic fibers. As a result, these conventional yarns have very limited use at high temperatures and under conditions where force resistance is required. Specifically, such yarns rapidly deteriorate when used on articles that are subjected to high temperatures and they have limited strength.

Increasingly, high performance yarns are being used in place of conventional yarns. High performance yarns have both increased strength and an increased elastic modulus compared to conventional yarns. Typically, the high performance yarns are formed from inorganic fibers. The use of these fibers has resulted in a new family of yarns and fabrics that have high tensile strengths and modulus and the ability to maintain these properties at elevated temperatures. Nevertheless, the strength and heat resistance of known inorganic fibers can be improved upon.

In order to manufacture inorganic fibers, mineral powders of the desired constituents are typically used. These mineral powders, however, can require significant processing that can be expensive. Further, use of specific mineral powders often requires additional transportation and storage costs.

To improve upon the strength and heat resistance of known inorganic fibers and to avoid the requirements involved in using mineral powders to create such fibers, the present invention utilizes unrefined raw materials, such as volcanic rock, to manufacture inorganic fiber. While fibers manufactured from volcanic rock have been found to exhibit excellent strength and heat resistance, the use of volcanic rock requires special processing considerations.

In light of the above, it is an object of the present invention to provide systems and methods for manufacturing an inorganic yarn. Another object of the present invention is to provide systems and methods for manufacturing an inorganic yarn from volcanic rock. It is yet another object of the present invention to provide systems and methods in which potassium permanganate is utilized to melt volcanic rock to form an inorganic yarn. Still another object of the present invention is to provide systems for forming inorganic yarns, and methods of using the systems, that are relatively easy to create, simple to operate and comparatively cost effective.

SUMMARY OF THE INVENTION

The present invention is directed to a method and system for manufacturing an inorganic yarn. For the present invention, a volcanic rock is mixed with an additive to prepare a raw material that can then be processed to create the inorganic yarn. Preferably, the volcanic rock is black rock that may contain aluminum oxide, iron oxide, silicon dioxide, titanium dioxide, magnesium oxide, calcium oxide, sodium oxide, and/or potassium oxide. Also, the additive preferably includes potassium permanganate, iron oxide, whitestone and boron.

In order to receive and process the volcanic rock and additive, the system includes a chamber that is formed within a cupola furnace. Specifically, for the purposes of the present invention, the cupola furnace needs to be capable of attaining temperatures that are sufficient to liquefy the raw material to form a melt. Further, the system includes a spinning device that receives the melt from the furnace for processing. As envisioned for the present invention, the spinning device is an extrusion device such as a spinneret that is designed to receive the melt and to transform it into a plurality of filaments.

The system of the present invention also includes a cooling device. Specifically, the cooling device is provided to receive the plurality of filaments from the spinning device, and to cool them for additional processing. The cooled filaments are then passed to a sizing station where they can be sized with a rayon agent to create sized fibers. In order to make inorganic yarn from the sized fibers, the system includes a twisting device that is capable of twisting the fibers into a yarn, in a manner well known in the art.

For the operation of the system, a plurality of similarly dimensioned individual rocks are graded or otherwise prepared from black rock so that each individual rock has a diameter in a range between approximately four and approximately eight inches. The graded rocks are placed in the chamber of the furnace. At the same time, the additive, in the form of crushed solids, is added to the black rock. Preferably, the raw materials that are received in the chamber are apportioned such that there are approximately one hundred parts of black rock and approximately fourteen parts of additive. After the raw materials have been received in the chamber, the temperature of the furnace is raised to a range between approximately nine hundred and fifty five degrees Centigrade (955° C.) and approximately twelve hundred and seventy degrees Centigrade (1270° C.). In this process, the potassium permanganate is burned, and is thereby effectively utilized by the furnace as fuel. Importantly, as the potassium permanganate burns, the black rock and other additive constituents liquefy to form a melt.

Once the mixture is liquefied, and the potassium permanganate is burned off, the melt is delivered to the spinning device. As with known melt spinning devices, the melt is pumped or otherwise forced through an aperture or apertures in the spinning device. In this manner, the spinning device extrudes a plurality of filaments having diameters substantially in a range between one and ten microns.

After the plurality of filaments are formed, they are delivered to the cooling device where they go through a cooling process. In detail, the melt is first cooled to about eight hundred degrees Centigrade (800° C.) and maintained at that temperature for approximately thirty minutes. Then the melt is cooled to about three hundred and fifty five degrees Centigrade (355° C.) and maintained at that temperature for approximately thirty minutes. After cooling, the plurality of filaments are then taken to a sizing station where they are sized and formed into fibers. Specifically, the sizing is performed with a rayon agent that prevents mechanical damage to the fibers and/or helps the fibers to adhere to one another. Once the fibers are sized, they are then twisted together by a twisting device to make the inorganic yarn. The twisting device may draft the fibers during creation of the inorganic yarn. Preferably, the resulting yarn has a diameter in a range of ten to fifteen millimeters.

BRIEF DESCRIPTION OF THE DRAWING

The novel features of this invention, as well as the invention itself, both as to its structure and its operation, will be best understood from the accompanying drawing, taken in conjunction with the accompanying description, in which the FIGURE is a schematic diagram exemplifying a method for manufacturing inorganic yarn in accordance with the present invention.

DESCRIPTION OF THE PREFERRED EMBODIMENT

Referring to the FIGURE, a system for manufacturing inorganic yarn in accordance with the present invention is shown and generally designated 10. As shown, the system 10 includes a furnace 12. The furnace 12 is preferably a cupola furnace and includes a chamber 14 formed by a sidewall 16. The chamber 14 is dimensioned to receive the raw materials 18 needed to manufacture the inorganic yarn. Specifically, the raw materials 18 include black rock 20 and an additive 22. As indicated, the black rock 20 and additive 22 are provided to the chamber 14 in the form of crushed solids. Once they are received in the chamber 14, they are liquefied therein to form a melt 24.

Downstream of the furnace 12, the system 10 includes a spinning device 26. The spinning device 26 may be integral with the furnace 12 or it may be connected directly to the furnace 12 for receiving the melt 24. Alternatively, the melt 24 may be delivered to the spinning device 26 via a carrier such as a ladle or the like. In either case, the spinning device 26 includes a pump or other means to force the melt 24 though an aperture, or several apertures, to form a plurality of filaments 28. Preferably, the apertures of the spinning device 26 are formed by a stationary platinum nozzle that can withstand the high temperatures of the melt 24.

As shown in the FIGURE, the system 10 further includes a cooling device 30 that is positioned downstream of the spinning device 26. Similar to the spinning device 26, the cooling device 30 may be integral with the furnace 12 or it may be connected thereto. As shown, the cooling device 30 is positioned to receive the plurality of filaments 28 from the spinning device 26. Further, a sizing station 32 is positioned downstream of the cooling device 30 to receive the plurality of filaments 28 therefrom. The sizing station 32 includes a sizing agent 34 that can be applied to the plurality of filaments 28 to form a plurality of fibers 36. As is further shown in the FIGURE, a twisting device 38 is positioned immediately downstream of the sizing station 32. The twisting device 38 receives the plurality of fibers 36 and forms the inorganic yarn 40 therefrom.

In more detail, the black rock 20 of the present invention is preferably of the type of volcanic rock that is commonly found in Oregon, Washington and other locations. Such black rock 20 typically contains about 44 wt. % calcium oxide, 41 wt. % magnesium oxide, 10 wt. % potassium oxide, 1 wt. % aluminum oxide, 1 wt. % iron oxide, 1 wt. % silicon dioxide, 1 wt. % titanium dioxide, and 1 wt. % sodium oxide. Unless treated or mixed with other materials, the black rock 20 typically has a melting point of over twelve hundred degrees Centigrade (1200° C.). Before it is introduced to the chamber 14 of the furnace 12, the black rock 20 is graded to individual pieces having diameters "d" of about 4-8 inches. Preferably, the individual pieces of black rock 20 all have substantially the same diameter "d".

As further shown in the FIGURE, the additive 22 is provided in the form of crushed solids. The additive 22 preferably has a melting point of about 900° C. and includes about 26-33 wt. % potassium permanganate, 39-45 wt. % iron oxide, 22-31 wt. % whitestone and 3 wt. % boron. For the invention, the potassium permanganate is provided as a fuel source for melting the raw materials 18 and the iron oxide is provided to modify the black rock 20. Further, the boron and whitestone, which contains about 58 wt. % calcium oxide, 41 wt. % magnesium oxide, less than 1 wt. % silicon oxide, and less than 1 wt. % iron oxide, are provided to reduce the melting point and facilitate processing of the mixture of raw materials 18.

As a batch process, a desired amount of black rock 20 and additive 22 are delivered to the furnace 12. Preferably, the raw material 18 provided to the chamber 14 consists essentially of 60-90 wt. % black rock 20 and 40-10 wt. % additive 22. In certain preferred embodiments, the raw material 18 consists essentially of 87-88% black rock 20 and 13-12% additive 22. In such an embodiment, the mixture of raw material 18 includes about 5-6 wt. % potassium permanganate, 4-6 wt. % whitestone, 8 wt. % iron oxide, and 0.6 wt. % boron. Volumetrically, the raw material 18 is preferably about one hundred parts of black rock 20 and about fourteen parts of additive 22.

When positioned in the chamber 14 of the furnace 12, the mixture of raw materials 18 is heated to a temperature in the range of approximately 955° C.-1270° C., and preferably to between 1200° C. and 1270° C. Regardless of the specific temperature attained, the mixture of raw materials 18 is heated sufficiently to reduce the raw materials 18 to liquefy to a melt 24 having a viscosity proper for processing. During heating, the potassium permanganate is burned as a fuel and facilitates liquefying the other raw materials 18.

After the melt 24 is properly formed, it is delivered to the spinning device 26. The spinning device 26 extrudes the melt 24 into a plurality of filaments 28 by forcing the melt 24 through its nozzle. The resulting filaments 28 have diameters substantially in a range between one and ten microns. In order to prevent deformation of the filaments 28, they are delivered to the cooling device 30 to be cooled and hardened to a soft solid state. During the cooling process, the cooling device 30 first cools the plurality of filaments 28 to 800° C. and maintains that temperature for 30 minutes. Then it cools the plurality of filaments 28 to 355° C. and maintains that temperature for 30 minutes. As a result, the plurality of filaments 28 reaches a substantially soft solid state that facilitates further processing.

After being cooled to 355° C., the filaments 28 are passed to the sizing station 32. At the sizing station 32, a rayon sizing agent 34 is applied to the plurality of filaments 28. Specifically, the plurality of filaments 28 are coated with the rayon agent 34 to form a plurality of fibers 36. The rayon agent 34 is preferably in yarn form and is provided in an amount such that rayon forms 2 wt. % of the resulting fibers 36. As a result of the rayon coating, the fibers 36 are protected from mechanical damage and formation of yarn from the fibers 36 is facilitated. Once they have been sized, the fibers 36 are collected and processed by the twisting device 38. Specifically, the twisting device 38 drafts and twists the plurality of fibers 36 to form the inorganic yarn 40. Preferably, the resulting inorganic yarn 40 has a diameter in a range of ten to fifteen millimeters. A representative yarn manufactured according to the inventive method may be comprised of about 40 wt. % calcium oxide, 36.6 wt. % magnesium oxide, 8.4 wt. % potassium oxide, 0.8 wt. % aluminum oxide, 0.85 wt. % iron oxide, 0.85 wt. % silicon dioxide, 0.8 wt. % titanium dioxide, 0.8 wt. % sodium oxide, 0.6 wt. % boron, 8 wt. % iron oxide, and 2 wt. % rayon. Such a yarn has a melting point in the range between approximately 1500° C. and approximately 1650° C. and has a working range of about −130° C. to 700° C. Further, the yarn is relatively very light, with a density of about one and six tenths grams per cubic centimeter (1.6 g/cc).

While the particular system and method as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for manufacturing an inorganic yarn which comprises the steps of:
    mixing a volcanic rock with an additive to prepare a raw material, wherein the additive includes potassium permanganate;
    melting the raw material to create a melt, wherein the potassium permanganate is consumed during creation of the melt;
    spinning the melt to create a plurality of filaments having diameters substantially in a range between one and ten microns;
    cooling the plurality of filaments; sizing the plurality of filaments with a rayon agent to create fibers; and
    twisting the plurality of fibers to make the inorganic yarn.

2. The method recited in claim 1 wherein the volcanic rock is black rock and the raw material includes approximately one hundred parts of black rock and approximately fourteen parts of additive.

3. The method recited in claim 2 wherein the black rock in the raw material includes a plurality of individual rocks with each rock having a substantially same diameter "d", and wherein the additive in the raw material is crushed solids.

4. The method recited in claim 3 wherein the diameter "d" of each individual black rock is in a range between approximately four and approximately eight inches.

5. The method recited in claim 1 wherein the additive further includes iron oxide, crushed whitestone, and boron.

6. The method recited in claim 1 wherein the melting step is accomplished at a temperature in a range between approximately nine hundred and fifty five degrees Centigrade (955° C.) and approximately twelve hundred and seventy degrees Centigrade (1270° C.).

7. The method as recited in claim 1 wherein the spinning step is accomplished by extruding the melt through a stationary nozzle made of platinum.

8. The method recited in claim 1 wherein the cooling step is accomplished by the steps of: first cooling the melt to a temperature of about eight hundred degrees Centigrade (800° C.); maintaining the first cooling temperature for approximately thirty minutes; second cooling the melt to a temperature of about three hundred and fifty five degrees Centigrade (355° C.); and maintaining the second cooling temperature for approximately thirty minutes.

9. The method recited in claim 1 further comprising the step of drafting the fibers to create the inorganic yarn with a diameter in a range of ten to fifteen millimeters.

10. The method recited in claim 1 wherein the potassium permanganate fuels the melting step.

11. The method recited in claim 1 wherein the inorganic yarn comprises about 40 wt. % calcium oxide, 36.6 wt. % magnesium oxide, 8.4 wt. % potassium oxide, 0.8 wt. % aluminum oxide, 0.85 wt. % iron oxide, 0.85 wt. % silicon dioxide, 0.8 wt. % titanium dioxide, 0.8 wt. % sodium oxide, 0.6 wt. % boron, 8 wt. % iron oxide, and 2 wt. % rayon.

12. The method as recited in claim 1 wherein the inorganic yarn has a melting point in the range between approximately 1500° C. and approximately 1650° C.

13. The method as recited in claim 1 wherein the inorganic yarn has a working range of about −130° C. to 700°C.

14. The method as recited in claim 1 wherein the inorganic yarn has a density of about 1.6 g/cc.

15. A method for manufacturing an inorganic yarn which comprises the steps of:
    providing rock consisting of calcium oxide, magnesium oxide, potassium oxide, aluminum oxide, iron oxide, silicon dioxide, titanium dioxide, and sodium oxide;
    mixing the rock with an additive to prepare a raw material, wherein the additive includes potassium permanganate;
    melting the raw material to create a melt, wherein the potassium permanganate is consumed during creation of the melt;
    spinning the melt to create a plurality of filaments having diameters substantially in a range between one and ten microns;
    cooling the plurality of filaments; sizing the plurality of filaments with a rayon agent to create fibers; and
    twisting the plurality of fibers to make the inorganic yarn.

16. The method recited in claim 15 wherein the inorganic yarn comprises about 40 wt. % calcium oxide, 36.6 wt. % magnesium oxide, 8.4 wt. % potassium oxide, 0.8 wt. % aluminum oxide, 0.85 wt. % iron oxide, 0.85 wt. % silicon dioxide, 0.8 wt. % titanium dioxide, 0.8 wt. % sodium oxide, 0.6 wt. % boron, 8 wt. % iron oxide, and 2 wt. % rayon.

17. The method as recited in claim 15 wherein the inorganic yarn has a melting point in the range between approximately 1500° C. and approximately 1650° C.

18. The method as recited in claim 15 wherein the inorganic yarn has a working range of about −130° C. to 700° C.

19. The method as recited in claim 15 wherein the inorganic yarn has a density of about 1.6 g/cc.

20. A method for manufacturing an inorganic yarn which comprises the steps of:
    providing rock consisting of calcium oxide, magnesium oxide, potassium oxide, aluminum oxide, iron oxide, silicon dioxide, titanium dioxide, and sodium oxide;
    supplying an additive consisting of potassium permanganate, iron oxide, crushed whitestone, and boron;
    mixing the rock with the additive to prepare a raw material;
    melting the raw material at a temperature in a range between approximately 955° C. and approximately 1270° C. to create a melt, wherein the potassium permanganate is consumed during creation of the melt;
    spinning the melt to create a plurality of filaments having diameters substantially in a range between one and ten microns;
    cooling the plurality of filaments; sizing the plurality of filaments with a rayon agent to create fibers; and
    twisting the plurality of fibers to make the inorganic yarn.

* * * * *